(12) United States Patent
Wilson (10) Patent No.: US 12,554,655 B2
(45) Date of Patent: Feb. 17, 2026

(54) BACKUPS FOR CLOUD-BASED 5G NETWORKS

(71) Applicant: DISH Wireless L.L.C., Englewood, CO (US)

(72) Inventor: Steven Wilson, Englewood, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 354 days.

(21) Appl. No.: 18/185,665

(22) Filed: Mar. 17, 2023

(65) Prior Publication Data

US 2023/0359569 A1 Nov. 9, 2023

Related U.S. Application Data

(60) Provisional application No. 63/338,162, filed on May 4, 2022.

(51) Int. Cl.
| | | |
|---|---|---|
| *G06F 12/14* | (2006.01) | |
| *G06F 11/14* | (2006.01) | |
| *G06F 11/1446* | (2026.01) | |

(52) U.S. Cl.
CPC ...... *G06F 12/1408* (2013.01); *G06F 11/1451* (2013.01); *G06F 2201/84* (2013.01); *G06F 2212/1052* (2013.01)

(58) Field of Classification Search
CPC ... G06F 12/1408; G06F 11/1446–1451; G06F 2201/84
See application file for complete search history.

(56) References Cited

U.S. PATENT DOCUMENTS

| | | | | |
|---|---|---|---|---|
| 8,156,375 | B1* | 4/2012 | Greene | G06F 11/1469 |
| | | | | 707/685 |
| 10,496,838 | B1* | 12/2019 | Kiran | G06F 21/602 |
| 11,914,731 | B1* | 2/2024 | Velickovic | G06F 21/6218 |
| 2010/0318812 | A1* | 12/2010 | Auradkar | H04L 9/0894 |
| | | | | 713/193 |
| 2018/0145970 | A1* | 5/2018 | Agrawal | H04L 63/105 |
| 2018/0150234 | A1* | 5/2018 | Karmarkar | G06F 3/0629 |
| 2018/0262337 | A1* | 9/2018 | Zubov | H04L 9/3226 |
| 2019/0034110 | A1* | 1/2019 | Liu | G06F 21/79 |
| 2022/0060317 | A1* | 2/2022 | Ponnuswamy | H04L 9/0631 |
| 2022/0263657 | A1* | 8/2022 | Chang | H04L 9/0861 |

* cited by examiner

*Primary Examiner* — Jonathan A Bui
(74) *Attorney, Agent, or Firm* — KW Law, LLP (57) ABSTRACT

Systems and methods for backing up a cloud-based network include a first instance of a computing resource running in a first region. A first backup service is running in the first region and configured to take a first backup of the first instance. The backup service uses a key management service of the first region to encrypt the first backup with a first cryptographic key to generate a first encrypted backup. The first encrypted backup is stored in a first backup vault of the first region. A second backup service runs in a second region and receives a copy of the first backup. A second key management service of the second region encrypts the copy of the first backup using a second cryptographic key to generate a second encrypted backup. The second encrypted backup is stored in a second backup vault of the second region.

20 Claims, 4 Drawing Sheets

BACKUPS FOR CLOUD-BASED 5G NETWORKS

CROSS-REFERENCE TO RELATED APPLICATIONS

This application claims priority to U.S. Provisional Patent Application No. 63/338,162 filed on May 4, 2022, and entitled "BACKUPS FOR CLOUD-BASED 5G NETWORKS," which is incorporated herein by reference.

TECHNICAL FIELD

The following discussion generally relates to backup systems, and in particular to systems and methods for backing up virtualized components of cloud-based networks.

BACKGROUND

Computing systems fail, often resulting in data loss and downtime. System-level, application-level, or data-level backups are all examples of countermeasures that can be effective against such failures. However, backups have long been vulnerable to complete loss as the result of a disaster at the storage location of the backup.

As cloud-based systems become more prevalent, virtual systems are frequently commissioned and decommissioned during normal operation. These virtual assets may be spun up at different geographic locations using backups. In some systems, a copy of the backup must be transferred to a restoration location before successfully restoring a system or otherwise launching a virtual machine from the backup.

Restoring a computing asset from a backup can be time consuming, particularly when a transfer step is a prerequisite to restore or launch the asset at a different facility than the backup location. In addition to incurring a time cost, the transfer process consumes bandwidth that might otherwise be available for operations. A need exists for an expedient and cost-effective system for backing up and restoring cloud-based systems running at different geographic locations.

System backups are also vulnerable to data loss or modification if stored in cleartext, for example, or otherwise stored in unprotected or minimally protected storage configurations. Backing up and transferring backups to a different geographic location using some traditional methods may tend to expose backup files to malfeasance, whether intentional or not, because of insufficient security controls such as shared cryptographic keys. Accidental or intentional corruption or loss of backup files introduces a risk that a desired backup file may not be reliable when accessed, which can be problematic as systems are brought online from backups of unknown integrity.

SUMMARY

Various embodiments take secure backups in a cloud-based network for rapid redeployment. An embodiment of a backup system for a cloud-based data and telephone network includes a first instance of a computing resource running in a first region. A first backup service is running in the first region and configured to take a first backup of the first instance. The backup service uses a key management service of the first region to encrypt the first backup with a first cryptographic key to generate a first encrypted backup. The first encrypted backup is stored in a first backup vault of the first region. A second backup service is running in a second region and in communication across a transit gateway with the first backup service. The second backup service receives a copy of the first backup. A second key management service of the second region encrypts the copy of the first backup using a second cryptographic key to generate a second encrypted backup. The second encrypted backup is stored in a second backup vault of the second region.

An embodiment of an automated process for taking backups in a cloud-based environment includes the step of launching a first instance of a computing resource in a first region to perform a predetermined function. A first backup service runs in the first region to take a first backup of the first instance. The first backup service uses a first key management service hosted in the first region to encrypt the first backup with a first cryptographic key and generate a first encrypted backup. The first encrypted backup is stored in a first backup vault hosted in the first region. The process includes running a second backup service in a second region and in communication across a transit gateway with the first backup service. The second backup service receives a copy of the first backup from the first backup service. The second backup service uses a second key management service hosted in the second region that encrypts the copy of the first backup using a second cryptographic key to generate a second encrypted backup. The second encrypted backup is stored in a second backup vault hosted in the second region. The process further includes decrypting the second encrypted backup using the second cryptographic key to generate an unencrypted copy of the first backup. A second instance of the computing resource is launched in the second region from the unencrypted copy of the first backup to perform the predetermined function.

An automated process for taking backups in a cloud-based environment includes launching a first instance of a computing resource in a first region to perform a predetermined function, in accordance with various embodiments. A process is run at a predetermined interval to tag the first instance with tags indicating backup settings. A first backup service runs in the first region that takes a first backup of the first instance in response to the backup settings tagged to the first instance. A first key management service hosted in the first region encrypts the first backup using a first cryptographic key to generate a first encrypted backup. The process includes storing the first encrypted backup in a first backup vault hosted in the first region, running a second backup service in a second region, and receiving, by the second backup service in the second region, a copy of the first backup from the first backup service in the first region. The second backup service is in communication across a transit gateway with the first backup service. A second key management service hosted in the second region encrypts the copy of the first backup using a second cryptographic key to generate a second encrypted backup. The second encrypted backup is stored in a second backup vault hosted in the second region.

In various embodiments, the second backup service decrypts the second encrypted backup using the second cryptographic key to generate the copy of the first backup. The second backup service creates a second instance running in the second region from the copy of the first backup. The first region comprises a first availability zone, and the second region comprises a second availability zone. The first region is geographically remote from the second region. A process runs at a predetermined interval to tag the first instance with backup settings. A process runs at a predetermined interval to associate tags with the first instance. The tags indicate backup settings. The backup settings indicated by the tags include a backup frequency and a retention period associated with the first instance. The first key management service is isolated from the second cryptographic key, and the second key management service is isolated from the first cryptographic key.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the illustrations.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Systems, methods, and devices of the present disclosure enable expedient and cost-effective backup and restoration of cloud-based assets in a secure manner. The backup systems described herein can support a cloud-based data and telephone networks, though the backup systems described herein may be implemented in any cloud-based environment.

According to various embodiments, a distributed backup and restoration system operates in support of various cloud-based computing assets in a mobile network system. Backups are taken in one geographic region for cloud-based assets running in that region, and the backups are stored in a backup vault that is local to the region. Cryptographic keys are used to manage access backups in the vault. Backup files are replicated at a geographically remote location and stored in a separate backup vault integrated with a separate key management service. The system can use a transit gateway to transfer backup files at low cost without consuming operational bandwidth.

Using replicated backups in different geographic regions allows for real time (or near real-time, accounting for some delays inherent in processing, data communications and the like) restoration or commissioning of virtual assets in a 5G wireless network in a secure and efficient manner. The use of a distributed backup system also provides for rapid adaptation to dynamic cloud-based systems in a manner that makes very efficient use of available data processing resources, thereby conserving energy, data storage, and cost to the system operator.

Additionally, the use of different key management services running in different regions to store the copies of the same backup as described below promotes the use of different cryptographic keys to encrypt and store copies of the same backup. The duplicative copies stored using different encryption keys tend to protect the backups from tampering.

The backups can be used to support virtualized components of telephony networks. Traditionally, data and telephone networks relied upon proprietary designs based upon very specialized hardware and dedicated point-to-point data connections. More recently, industry standards such as the Open Radio Access Network ("Open RAN" or "0-RAN") standard have been developed to describe interactions between the network and various client devices. The O-RAN model follows a virtualized wireless architecture in which 5G base stations ("gNBs") are implemented using separate centralized units (CUs), distributed units (DUs) and radio units (RUs), along with various control planes that provide additional network functions (e.g., 5G Core, IMS, OSS/BSS/IT). Generally speaking, it is still necessary to implement the RUs with physical transmitters, antennas and other hardware located onsite within broadcast range of the end user's device.

Other components of the network, however, can be implemented using a more centralized architecture based upon cloud-based computing resources, such as those available from Amazon Web Services (AWS) or the like. This provides much better network management, scalability, reliability and redundancy, as well as other benefits. O-RAN CUs, DUs, control planes or other components of the network can now be implemented as software modules executed by distributed (e.g., "cloud") computing hardware. Other network functions such as access control, message routing, security, billing and the like can similarly be implemented using centralized cloud computing resources. Often, a CU, DU, control plane or other image is created in software for execution by one or more virtual computers operating in parallel within the cloud environment. Images may be created using backup systems described herein to support rapid scaling to increase or decrease the available computing capacity as needed.

The use of virtualized hardware provides numerous benefits in terms of rapid deployment and scalability, but it also presents certain technical challenges that have not been encountered in more traditional wireless networks. Unlike traditional wireless networks that scaled through the addition of physical routers, switches and other hardware, RAN networks can scale upwardly and downwardly very quickly as new cloud-based services are deployed or existing services are retired or redeployed. Additional network components can be very quickly deployed, for example, through the use of virtual components executing in a cloud environment that can be very quickly duplicated and spawned as needed to support increased demand. Similarly, virtual components can be de-commissioned very quickly with very little cost or effort when network capacity allows. The virtual components provide substantial efficiencies, especially when compared to prior networks based upon complex interconnections between geographically dispersed routers, servers and the like. One challenge that does arise, however, involves backing up and commissioning virtual components such a rapidly-evolving, dynamic network.

Figure 1:
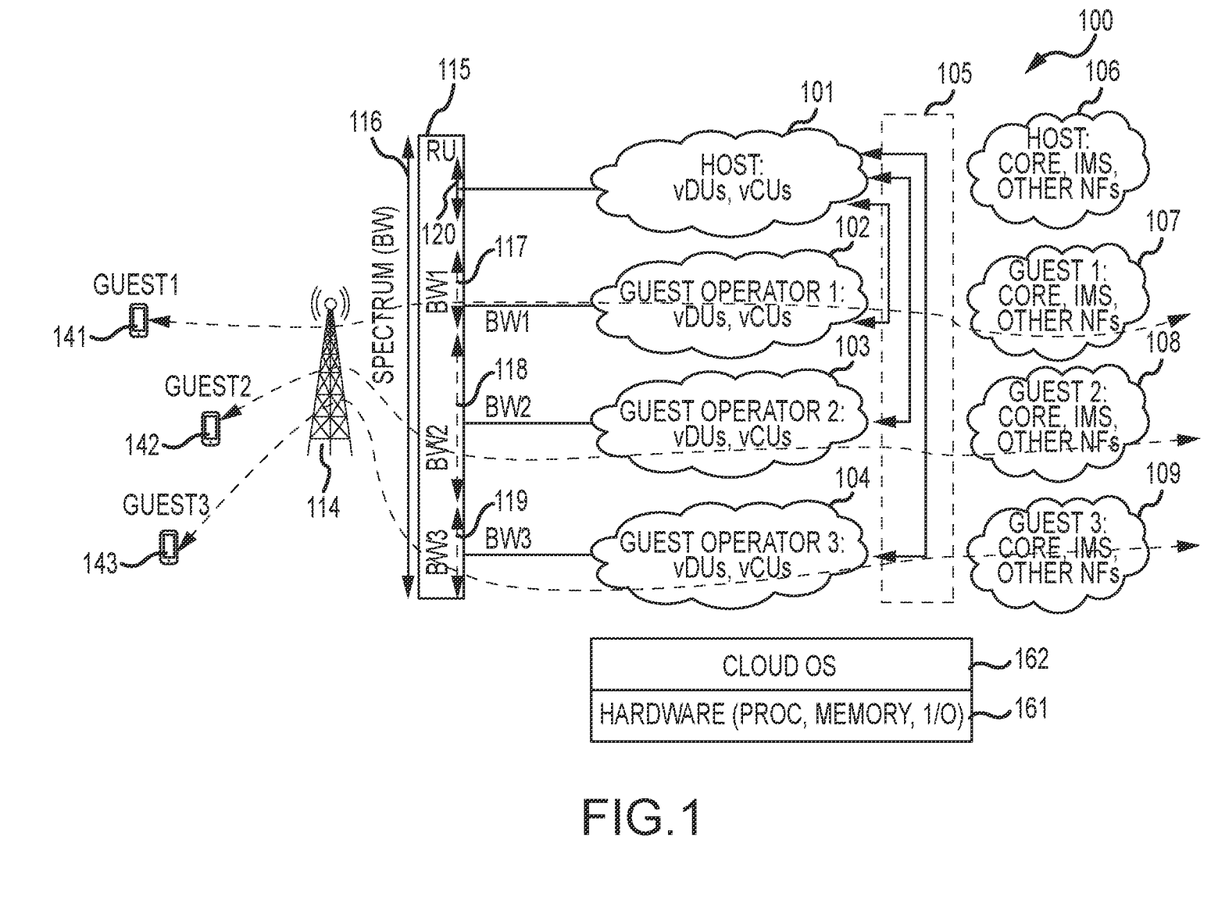
FIG. 1 illustrates an example of a cloud-based wireless network that includes virtualized network functions, in accordance with various embodiments.

Referring now to FIG. 1, an example cellular communication system 100 is shown having a backup and restoration system for virtualized network functions, in accordance with various embodiments. As used herein, the term network function may describe a functional building block within a network infrastructure. Network functions typically include well-defined external interfaces and a well-defined functional behavior. Network functions may be implemented in a cloud-based environment using virtualization tools such as, for example, virtual machines or containers. The systems described herein may thus spool up or retire network functions by launching a new instance or retiring an existing instance of the network function.

In various embodiments, cellular communication system 100 includes a host operator maintaining ownership of one or more radio units (RUs) 115 associated with a wireless network cell. The example of FIG. 1 depicts a host operator operating a "radio/spectrum as a service (R/SaaS)" that allocates bandwidth on its own radio units for use by one or more guest network operators, though the systems, methods, and devices described herein could be applied to any wireless network using virtualized network services. Examples of guest network operators may include internal brands of the host operator, system integrators, enterprises, external MVNOs, or converged operators. The host and the guest network operators may maintain desired network services to support user equipment (UE) 141, 142, 143, and may use backup and restoration systems to support network functions instantiating network services.

In the example of FIG. 1, each RU 115 communicates with UE 141, 142, 143 operating within a geographic area (e.g., a cell) using one or more antennas 114 (also referred to herein as towers) capable of transmitting and receiving messages within an assigned spectrum or bandwidth 116 of electromagnetic bandwidth. In various embodiments, guest networks 102, 103, 104 interact with a provisioning plane 105 to obtain desired spectrum (e.g., portions of bandwidth 117, 118, 119, 120, respectively) across one or more of the RUs 115 operated by the host 101. Provisioning plane 105 allows guest network operators to obtain or change their assigned bandwidths on different RUs 115 on an on-demand and dynamic basis. Network services 107, 108, 109 may be maintained by guest operators and network services 106 may be maintained by host 101. Network services are scaled up and down in response to network load, and backup and restoration of network services or other virtualized systems are taken and performed as described herein.

The Open RAN standard breaks communications into three main domains: the RU that handles radio frequency (RF) and lower physical layer functions of the radio protocol stack, including beamforming; the DU that handles higher physical access layer, media access (MAC) layer and radio link control (RLC) functions; and the CU that performs higher level functions, including quality of service (QoS) routing and the like. The CU also supports packet data convergence protocol (PDCP), service data adaptation protocol (SDAP) and radio resource controller (RRC) functions. The RU, DU and CU functions are described in more detail in the Open RAN standards, as updated from time to time, and may be modified as desired to implement the various functions and features described herein. In the example of FIG. 1, host 101 maintains one or more DUs and CUs (i.e., network functions) as part of its own network. The DU communicates with one or more RUs 115, as specified in the Open RAN standard.

The various network components shown in FIG. 1 are typically implemented using software or firmware instructions that are stored in a non-transitory data storage (e.g., a disk drive or solid-state memory) for execution by one or more processors. The various components shown in FIG. 1 can be implemented using cloud-based hardware 161 and an appropriate operating system 162 such as the AWS® platform, although other embodiments could use other cloud platforms or any type of conventional physical computing hardware 161, as desired. In that regard, components of network 100 may be implemented using network functions, containers, virtual machines, or other virtualized implementations suitable for a cloud-based network. Backups and restorations of the virtualized systems and network functions are performed across multiple geographic regions and managed using multiple key vaults with different encryption keys.

As illustrated in the example of FIG. 1, system 100 includes a host network 101 and one or more guest networks 102, 103, 104. The host network 101 is typically operated by an organization that owns radio equipment and sufficient spectrum (potentially on different bands) to offer 5G capacity and coverage. Host network 101 provides 5G service to connected UEs, and it manages network services available to its own UEs or those of its guest operators. Host network 101 includes at least one DU and at least one CU, both of which will typically be spooled up as virtual network functions restored from backups taken and stored on the cloud-based network.

Guest networks 102, 103, 104 operated by guest operators can manage their own networks using allocated portions of the bandwidth 116 handled by one or more of the RUs 115 associated with the host 101. The guest networks 102, 103, 104 communicate with one or more UEs 141-143 using allocated bandwidth 116 on the host's RU 115. Guest networks 102, 103, 104 may include one or more virtual DUs and CUs, as well as other network services 106, 107, 108, 109, as desired. Generally, one or more guest operators will instantiate its own 5G virtualized network functions (e.g., CMS, vCUs, vDUs, etc.) using cloud-based resources, as noted above. However, various embodiments may operate outside of cloud-based environments. Host network 101 may also generate its own network services to manage software and services available to UE 141-143.

Guest operators may lease or otherwise obtain any needed 5G access for its planned services, capacity and coverage based on an arrangement with the host provider. A guest provider may then operate and manages its own 5G network 102, 103, 104 independently of the host 101 and the other guests. A network operator can optimize its own network by implementing its own cloud-based network services, which may also be backed up and restored using the backup systems and techniques described herein.

Each RU 115 is typically associated with a different wireless cell that provides wireless data communications to user devices 141-143. RUs 115 may be implemented with radios, filters, amplifiers and other telecommunications hardware to transmit digital data streams via one or more antennas 114. Generally, RU hardware includes one or more processors, non-transitory data storage (e.g., a hard drive or solid state memory) and appropriate interfaces to perform the various functions described herein. RUs are physically located on-site with the transmitter/antenna 114, as appropriate. Conventional 5G networks may make use of any number of wireless cells spread across any geographic area, each with its own on-site RU 115.

RUs 115 support wireless communications with any number of user devices 141-143. UE 141-143 are often mobile phones or other portable devices that can move between different cells associated with the different RUs 115, although 5G networks are also widely expected to support home and office computing, industrial computing, robotics, Internet-of-Things (IoT) and many other devices. While the example illustrated in FIG. 1 shows one RU 115 for convenience, a practical implementation will typically have any number of virtualized RUs 115 that can each be individually configured to provide highly configurable geographic coverage for a host or guest network, if desired. Host 101 and guest operators 102, 103, 104 can automatically scale and manage using backup systems and methods described herein.

Figure 2:
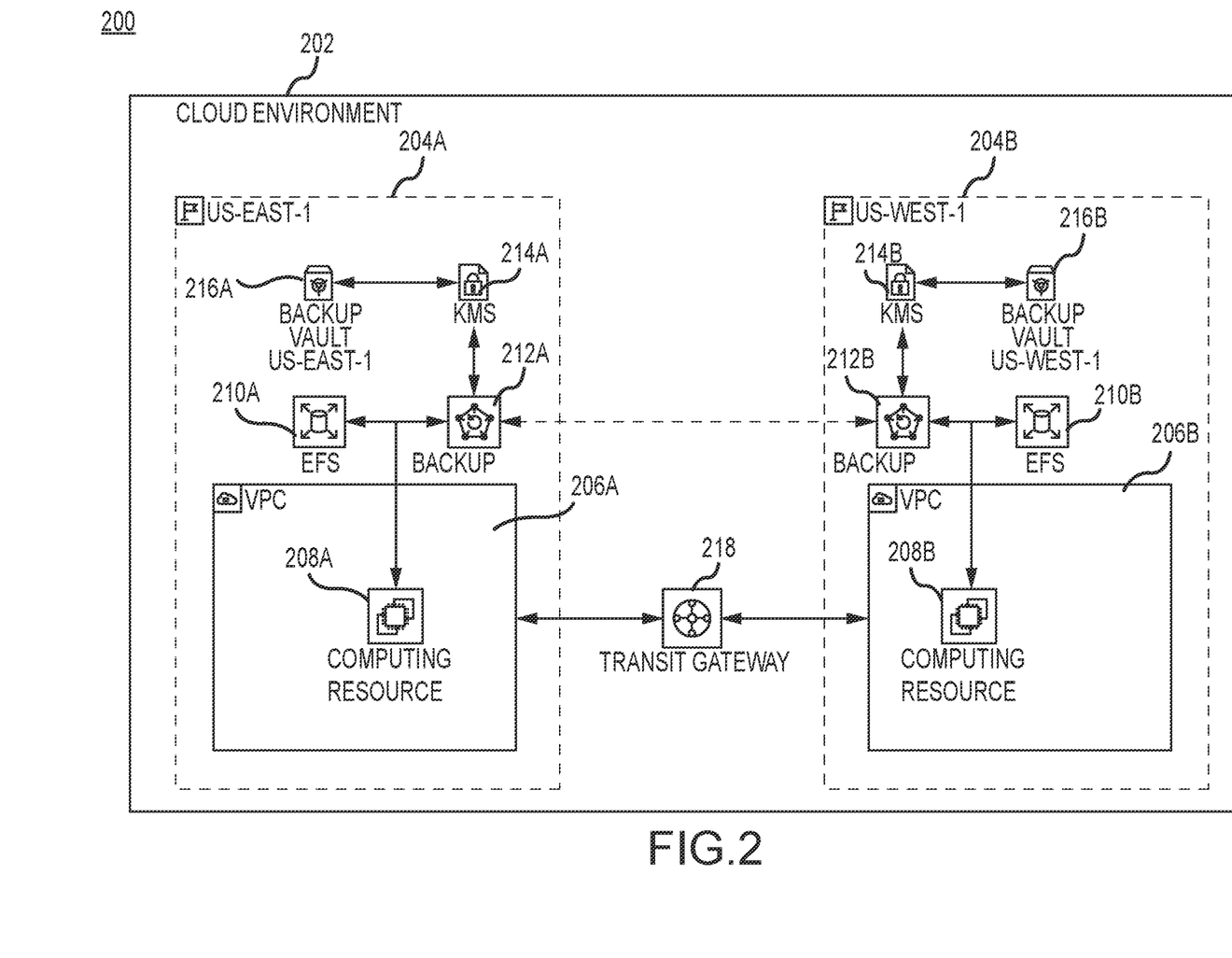
FIG. 2 illustrates an example architecture for a secure backup system on a cloud-based network, in accordance with various embodiments.

Referring now to FIG. 2, an example system 200 is shown for backing up cloud-based computing assets. The various functions depicted in FIG. 2 may be performed by programmed logic (e.g., software or firmware) stored within non-transitory memory and executed by processors, as appropriate. Other embodiments may perform additional functions or may organize the different functions in an equivalent but alternate manner. Cloud-based environment 202 may be a dedicated environment for operating a data and telephone network.

In various embodiments, a process or service running inside or outside of dedicated cloud-based environment 202 assesses virtual computing assets (e.g., instances 206) for backup settings as reflected by tags or other metadata associated with the virtual computing assets. Region 204A may be located geographically remote from region 204B, region 204A may be logically separated from region 204B, or region 204A may be isolated from region 204B in any other desirable manner. Functional elements of region 204B with a reference numeral ending in B are similar to or the same as functional elements of region 204A having the same reference numeral ending in A.

In the illustrated example of FIG. 2, regions 204A and 204B are availability zones. As used herein, the term availability zone may describe discrete data centers. Availability zones may include redundant power, networking, and connectivity. Different availability zones may be located in different geographic regions. Using availability zones enable operation of production applications and databases in a highly available, fault tolerant, and scalable manner. Availability zones may be interconnected with high-bandwidth, low-latency networking, over fully redundant, dedicated fiber lines that are end-to-end encrypted.

In various embodiments, a process or service runs at predetermined intervals to tag instances 206 that lack backup configurations based on tags. The process or service may look for a specific tag and may tag instances 206 that lack the specific tag with backup settings. The process may also deploy tags or overwrite tags for instances 206 in response to user input or configuration changes. The tags associated with an instance 206 may indicate backup frequency, retention period, backup size restrictions, backup retention locations, backup replication locations, or other backup characteristics for the associated instance 206. In an example embodiment, each instance 206 has a tag that corresponds to a backup schedule with a backup frequency and a retention period such as a tag reading "1-7," which indicates the tagged instance should be backed up daily and backups should be retained for 7 days. Other tagging schemes can also be used to identify backup characteristics associated with an instance 206.

Instance 206A runs on a computing resource 208A. In the example depicted in FIG. 2, computing resources 208A and 208B may be Elastic Compute Cloud (EC2) services available on AWS, though in other embodiments other cloud-computing resources may be used to host instances 206. Each instance 206A is in communication with a file system 210A. File system 210A may be, for example, an Elastic File System (EFS) available on AWS. File system 210A may also be a New Technology File System (NTFS), FAT32 file system, a relational database, a structured data store, an unstructured data store, or any other suitable storage system. Instance 206A and file system 210A may also be in communication with a backup service 212A.

The backup service depicted in the example of FIG. 2 may be, for example, an AWS backup service. Although the features depicted in the example of FIG. 2 may be implemented using AWS-based tools, system 200 can be implemented on any cloud-service provider. System 200 may also be implemented using tools hosted on ServerSpace, Microsoft Azure, Google Cloud Platform, IBM Cloud Services, Kamatera, VMware, or any other cloud service provider, for example.

In various embodiment, a key management service 214A (KMS) encrypts backups of instances 206A running in its region 204A. In the illustrated example, KMS 214A and KMS 214B can be key management services hosted by AWS. KMS 214A stores the encrypted backups from its instances 206A in vault 216A. KMS 214A also may also store encrypted backups from instances 206B in vault 216A.

Backups are replicated into other regions using a transit gateway 218 in various embodiments. For example, backups taken in region 204A may be replicated to or otherwise stored in region 204B. Transit gateway 218 may be a low-cost data transfer medium dedicated to operations of the hosting cloud-platform. For example, transit gateway 218 may be backbone data transit maintained and operated by a cloud-service provider such as AWS.

Backups stored in different regions may use different cryptographic keys in various embodiments. For example, a backup of instance 206A stored in vault 216A may be encrypted using a key stored in KMS 214A, while a replicated copy of the same backup of instance 206A stored in vault 216B is encrypted using a different key stored in KMS 214B. The use of different keys in different regions 204 may tend to improve security by restricting access according to least privilege principals. In response to different keys being used in different regions, an entity using the key from region 204A for a particular backup cannot access the same backup in region 204B using the same key from KMS 214A. Backup service 212A may be capable of taking backups and restoring instances 206 from backups. Backup service 212 may also be configured to replicate backups into other regions 204 across transit gateway 218.

By replicating backups into different regions 204, backups stored in one region tend to be protected from catastrophic loss in other regions. For example, backups in region 204A tend to be protected from disaster causing loss of data or computing devices in region 204B. Replication also enables rapid deployment of virtualized assets in different regions. For example, a copy of the backup of instance 206A from region 204A may be stored in region 204B so that a copy of instance 206A may be commissioned as instance 206B in region 204B in real-time using the backup. In that regard, a copy of instance 206A may be created in region 204B without decrypting the backup in region 204A and transferring the backup from region 204A to region 204B. Backups managed according to system 200 may enable instantiation according to the foregoing example without using bandwidth and time to accommodate an on-demand transfer of the backup to a different region prior to launching the duplicate instance.

Figure 3:
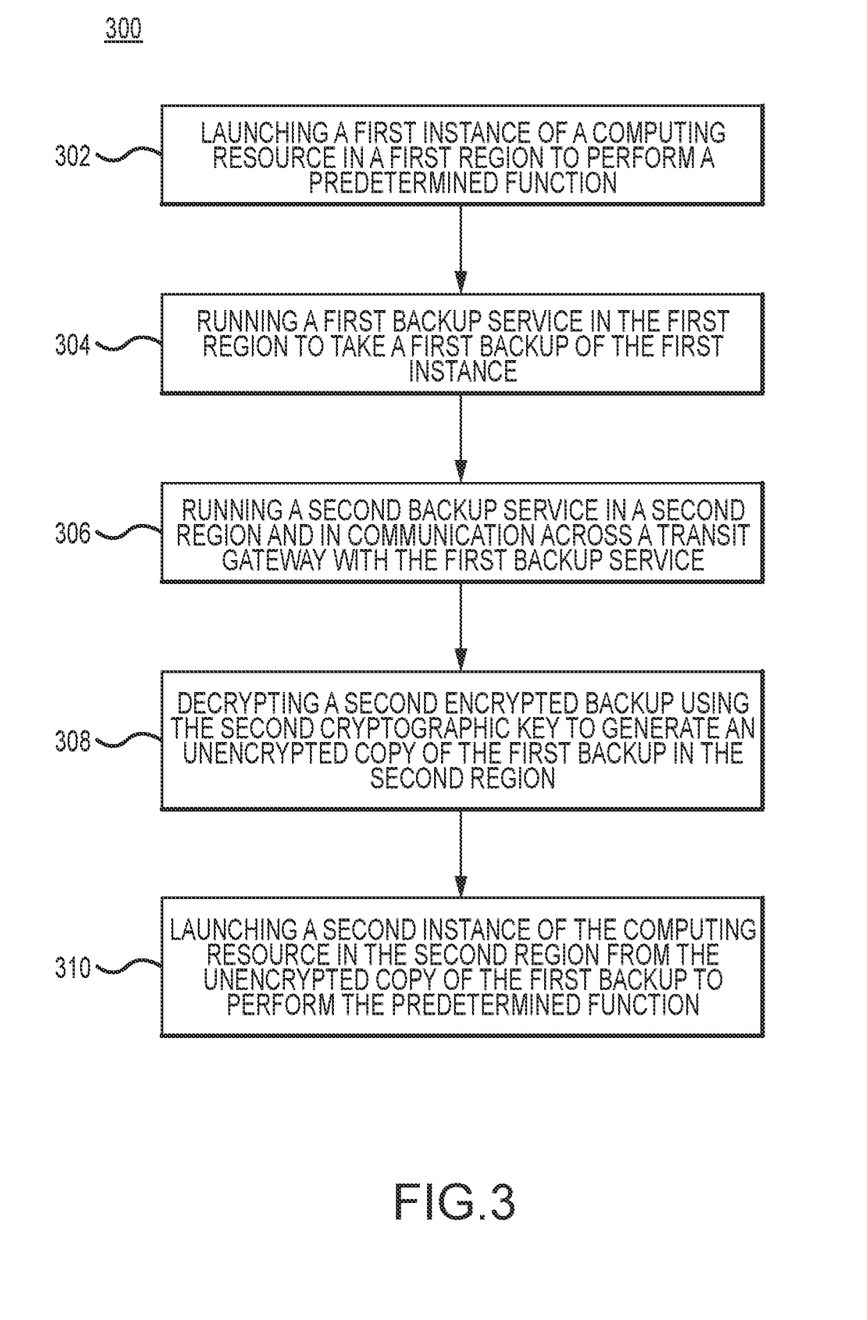
FIG. 3 illustrates an example of a process for backing up and launching network functions on a cloud-based wireless network, in accordance with various embodiments.

Referring now to FIG. 3, automated process 300 is shown for execution by system 200 to take backups in a cloud-based data and telephony network, in accordance with various embodiments. System 200 may launch a first instance 206A of a computing resource in a first region 204A to perform a predetermined network function (Block 302). The predetermined network function may be a virtual DU, virtual CU, core function, IMS function, or other network function in data and telephony network 100. The backup service 212A runs to take a backup of the first instance 206A (Block 304). The backup service 212A may use a key management service 214A hosted in the first region 204A to encrypt the first backup with a cryptographic key and generate an encrypted backup of instance 206A. The encrypted backup is stored in backup vault 216A hosted in the region 204A.

In various embodiments, a second backup service 212B runs in a second region 204B and is in communication across a transit gateway 218 with the first backup service 212A (Block 306). The second backup service 212B receives a copy of the backup of instance 206A from the first backup service 212A through transit gateway 218. The second backup service 212B uses a second key management service 214B hosted in the second region 204B that encrypts the copy of the backup of instance 206A using a second cryptographic key to generate a second encrypted backup of instance 206A. The second encrypted backup of instance 206A is stored in a second backup vault 216B hosted in the second region 204B. The same backup of instance may thus be stored and encrypted in two different regions using two different encryption keys.

Various embodiments of process 300 decrypt the second encrypted backup using the second cryptographic key to generate an unencrypted copy of the backup of instance 206A (Block 308). The cryptographic key may implement the Advanced Encryption Standard (AES), public key encryption, OpenPGP, or any other encryption technique. The first key management service is isolated from the second cryptographic key, and the second key management service is isolated from the first cryptographic key.

A second instance 206B of the computing resource is launched in the second region 204B from the unencrypted copy of the backup of instance 206A to perform the predetermined function (Block 310). The second backup service 212B decrypts the second encrypted backup using the second key management service 214B hosted in the second region 204B. The second key management service 214B uses its own encryption keys, which typically differ from the encryption keys of the first key management service 214A. The first region 204A and second region 204B may be different availability zones, geographic regions, cells, service areas, data centers, or any other suitable grouping. The first region 204A is typically geographically remote from the second region 204B to protect from disaster or other causes of catastrophic failure that are location dependent.

In various embodiments, a process runs at a predetermined interval to associate tags indicating backup settings with instances. The backup settings indicated by the tags typically include a backup frequency and a retention period associated with the tagged instance. Some embodiments may apply default retention period or frequency in response to the data missing from a tag.

Figure 4:
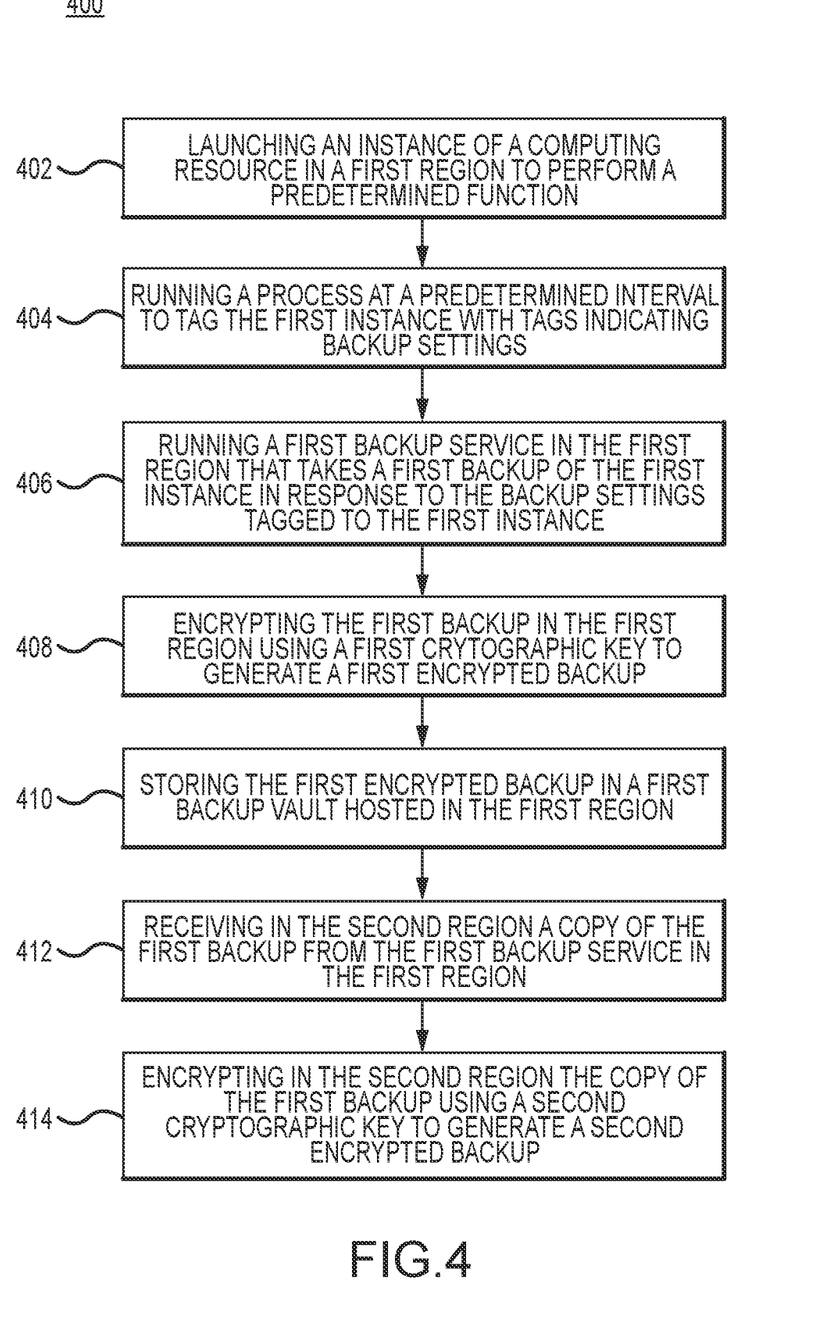
FIG. 4 illustrates an example of a process for backing up network functions on a cloud-based wireless network in multiple regions, in accordance with various embodiments.

Referring now to FIG. 4, an automated process 400 is shown for securely taking and replicating backups using system 200, in accordance with various embodiments. Process 400 includes launching a first instance 206A of a computing resource in a first region 204A to perform a predetermined function (Block 402). A process is run at a predetermined interval to tag the first instance with tags indicating backup settings (Block 404). A first backup service 212A runs in the first region 204A and takes a backup of the first instance 206A in response to the backup settings tagged to the first instance (Block 406). A first key management service is hosted in the first region 204A, and it encrypts the first backup using a first cryptographic key to generate an encrypted backup of first instance 206A (Block 408).

In various embodiments, system 200 stores storing the first encrypted backup in a first backup vault hosted in the first region 204A (Block 410). A second backup service 212B runs in a second region 204B and is in communication across a transit gateway with the first backup service 212A. The second backup service 212B in the second region 204B receives a copy of the first backup from the first backup service 212A in the first region 204A (Block 412). A second key management service 214B hosted in the second region 204B encrypts the copy of the first backup using a second cryptographic key to generate a second encrypted backup (Block 414). The second encrypted backup in a second backup vault 216B hosted in the second region 204B.

Various embodiments of system 200 decrypt the second encrypted backup using the second cryptographic key to generate an unencrypted copy of the first backup at the second region 204B. A second instance 206B of the computing resource is launched in second region 204B to perform the predetermined function. The second backup service 212B decrypts the second encrypted backup using the second key management service hosted in the second region 204B. The first region 204A and second region 204B are availability zones and are geographically remote from one another. The backup settings indicated by the tags include a backup frequency and a retention period associated with the first instance.

Systems, methods, and devices of the present disclosure tend to securely take and store backups from cloud-based instances of computing resources. The backups are stored at remote locations using different cryptographic keys as an additional layer of security. A compromised backup in one region thus would typically not compromise the backup in a different region. Storing backups in different regions also increases the speed of deploying computing resources in geographically disparate regions.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A backup system for a data and telephone network, comprising:
   a first instance of a computing resource running a network function of the data and telephone network in a first region;
   a first backup service running in the first region and configured to take a first backup of the first instance,
      wherein the first backup service uses a key management service of the first region to encrypt the first backup with a first cryptographic key to generate a first encrypted backup,
      wherein the first encrypted backup is stored in a first backup vault of the first region;
   a second backup service running in a second region and in communication across a transit gateway with the first backup service,
      wherein the second backup service receives an unencrypted copy of the first backup,
      wherein the second backup service uses a second key management service of the second region to encrypt the unencrypted copy of the first backup using a second cryptographic key to generate a second encrypted backup, and
      wherein the second encrypted backup is stored in a second backup vault of the second region; and
   a second instance of the computing resource running the network function of the data and telephone network in the second region,
      wherein the second instance is launched from the unencrypted copy of the first backup generated by decrypting the second encrypted backup in the second region.

2. The backup system of claim 1, wherein the second backup service decrypts the second encrypted backup using the second cryptographic key to generate the copy of the first backup.

3. The backup system of claim 2, wherein the second backup service creates a second instance running in the second region from the copy of the first backup.

4. The backup system of claim 1, wherein the first region comprises a first availability zone, and the second region comprises a second availability zone.

5. The backup system of claim 1, wherein the first region is geographically remote from the second region.

6. The backup system of claim 1, wherein a process runs at a predetermined interval to tag the first instance with backup settings.

7. An automated process for taking backups in a cloud-based environment, comprising:
   launching a first instance of a computing resource in a first region to perform a network function of a data and telephone network;
   running a first backup service in the first region to take a first backup of the first instance,
      wherein the first backup service uses a first key management service hosted in the first region to encrypt the first backup with a first cryptographic key and generate a first encrypted backup,
      wherein the first encrypted backup is stored in a first backup vault hosted in the first region;
   running a second backup service in a second region and in communication across a transit gateway with the first backup service,
      wherein the second backup service receives an unencrypted copy of the first backup from the first backup service,
      wherein the second backup service uses a second key management service hosted in the second region that encrypts the unencrypted copy of the first backup using a second cryptographic key to generate a second encrypted backup, and
      wherein the second encrypted backup is stored in a second backup vault hosted in the second region;
   decrypting the second encrypted backup using the second cryptographic key to generate an unencrypted copy of the first backup; and
   launching a second instance of the computing resource in the second region from the unencrypted copy of the first backup to perform the network function of the data and telephone network.

8. The automated process of claim 7, wherein the second backup service decrypts the second encrypted backup using the second key management service hosted in the second region.

9. The automated process of claim 7, wherein the first region comprises a first availability zone, and the second region comprises a second availability zone.

10. The automated process of claim 7, wherein the first region is geographically remote from the second region.

11. The automated process of claim 7, further comprising running a process at a predetermined interval to associate tags with the first instance, wherein the tags indicate backup settings.

12. The automated process of claim 11, wherein the backup settings indicated by the tags include a backup frequency and a retention period associated with the first instance.

13. The automated process of claim 7, wherein the first key management service is isolated from the second cryptographic key, and the second key management service is isolated from the first cryptographic key.

14. An automated process for taking backups in a cloud-based environment, comprising:
   launching a first instance of a computing resource in a first region to perform a predetermined function;

running a process at a predetermined interval to tag the first instance with tags indicating backup settings;

running a first backup service in the first region that takes a first backup of the first instance in response to the backup settings tagged to the first instance, encrypting, by a first key management service hosted in the first region, the first backup using a first cryptographic key to generate a first encrypted backup, storing the first encrypted backup in a first backup vault hosted in the first region;

running a second backup service in a second region, the second backup service in communication across a transit gateway with the first backup service, receiving, by the second backup service in the second region, an unencrypted copy of the first backup from the first backup service in the first region, encrypting, by a second key management service hosted in the second region, the unencrypted copy of the first backup using a second cryptographic key to generate a second encrypted backup; and storing the second encrypted backup in a second backup vault hosted in the second region.

15. The automated process of claim 14, further comprising:

decrypting the second encrypted backup using the second cryptographic key to generate an unencrypted copy of the first backup; and launching a second instance of the computing resource to perform the predetermined function in the second region from the unencrypted copy of the first backup.

16. The automated process of claim 15, wherein the second backup service decrypts the second encrypted backup using the second key management service hosted in the second region.

17. The automated process of claim 14, wherein the first region comprises a first availability zone, and the second region comprises a second availability zone.

18. The automated process of claim 14, wherein the first region is geographically remote from the second region.

19. The automated process of claim 14, wherein the backup settings indicated by the tags include a backup frequency and a retention period associated with the first instance.

20. The automated process of claim 14, wherein the first key management service is isolated from the second cryptographic key, and the second key management service is isolated from the first cryptographic key.

* * * * *